(12) United States Patent
Malecki et al.

(10) Patent No.: US 11,153,166 B2
(45) Date of Patent: *Oct. 19, 2021

(54) AUTOMATIC SELECTION OF CUT-POINT CONNECTIONS FOR DYNAMICALLY-CUT STREAM PROCESSING SYSTEMS

(71) Applicant: International Business Machines Corporation, Armonk, NY (US)

(72) Inventors: Bartlomiej Malecki, Slomniki (PL); Piotr Padkowski, Lodz (PL); Marek Peszt, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,819

(22) Filed: Aug. 21, 2019

(65) Prior Publication Data
US 2019/0379581 A1 Dec. 12, 2019

Related U.S. Application Data

(63) Continuation of application No. 15/911,657, filed on Mar. 5, 2018, now Pat. No. 10,432,462.

(51) Int. Cl.
*H04L 12/24* (2006.01)
*H04L 12/751* (2013.01)

(52) U.S. Cl.
CPC ...... *H04L 41/0823* (2013.01); *H04L 41/0893* (2013.01); *H04L 41/12* (2013.01);
(Continued)

(58) Field of Classification Search
CPC ............. H04L 41/0226; H04L 41/0823; H04L 41/0893; H04L 41/12; H04L 45/02; H04L 45/10; H04W 40/20; H04W 40/04
See application file for complete search history.

(56) References Cited

U.S. PATENT DOCUMENTS 8,635,224 B2  1/2014  Eldawy et al.
8,949,810 B2  2/2015  Andrade et al.
(Continued)

FOREIGN PATENT DOCUMENTS

WO   2016107488 A1   7/2016

OTHER PUBLICATIONS

"RestSep: Towards a Test-Oriented Privilege Partitioning Approach for RESTful APIs"; Luo et al.; 2017 IEEE International Conference on Web Services (ICWS); Jun. 25, 2017 (Year: 2017).*

(Continued)

*Primary Examiner* — Benjamin H Elliott, IV
(74) *Attorney, Agent, or Firm* — Nathan M. Rau

(57) ABSTRACT

A method for connecting graph processing cut endpoints is disclosed. The method comprises determining a first capability matrix comprising capability values, applying weights to the capability values of the first capability matrix resulting in a first weighted capability matrix, and determining a second capability matrix comprising, for each pairing of another side of the cut endpoint, capability values. For both, the first capability matrix and second capability matrix, the capability values relate at least to a platform, a runtime framework, a connection technology, a protocol for a connection of a node of the stream processing system. The method comprises further determining a joint weighted capability matrix for two corresponding cut endpoints of a cut by multiplying corresponding capability matrix values of the first weighted capability matrix and the second capability matrix, and selecting a preferred connection for the cut endpoints.

20 Claims, 10 Drawing Sheets

(52) U.S. Cl.
CPC .............. *H04L 45/02* (2013.01); *H04L 45/10* (2013.01); *H04L 41/0226* (2013.01)

(56) References Cited

U.S. PATENT DOCUMENTS

| | | | |
|---|---|---|---|
| 9,405,854 | B2 | 8/2016 | Jerzak et al. |
| 9,525,715 | B2 | 12/2016 | Bragstad et al. |
| 9,654,538 | B1 | 5/2017 | Kekre et al. |
| 10,432,462 | B2 * | 10/2019 | Malecki ............... H04W 40/20 |
| 2009/0300615 | A1 | 12/2009 | Andrade et al. |
| 2012/0030158 | A1 | 2/2012 | Hofberg et al. |
| 2013/0166712 | A1 | 6/2013 | Chandramouli et al. |
| 2014/0040343 | A1 | 2/2014 | Nickolov et al. |
| 2015/0256635 | A1 * | 9/2015 | Casey ................ G06F 16/2465 709/224 |
| 2016/0294630 | A1 | 10/2016 | Verma et al. |
| 2017/0214634 | A1 | 7/2017 | Li |
| 2018/0367557 | A1 | 12/2018 | Brown et al. |
| 2019/0050733 | A1 * | 2/2019 | Bopardikar ............... G06F 1/32 |
| 2019/0379581 | A1 * | 12/2019 | Malecki ............. H04L 41/0823 |

OTHER PUBLICATIONS

Cardellini et al., "Optimal Operator Placement for Distributed Stream Processing Applications," DEBS '16: Proceedings of the 10th ACM International Conference on Distributed and Event-based Systems, Jun. 2016, pp. 69-80, ACM. DOI: 10.1145/2933267.2933312.

Filippidou et al., "Online and On-demand Partitioning of Streaming Graphs," 2015 IEEE International Conference on Big Data (Big Data), 2015, pp. 1-10, IEEE. DOI: 10.1109/BigData.2015.7363735.

Khandekar et al., "COLA: Optimizing Stream Processing Applications via Graph Partitioning," LNCS 5896, Middleware 2009, Bacon and Cooper (Eds), pp. 308-327, © IFIP International Federation for Information Processing 2009.

Stanton et al., "Streaming Graph Partitioning for Large Distributed Graphs," KDD '12: Proceedings of the 18th ACM SIGKDD International Conference on Knowledge Discovery and Data Mining, pp. 1222-1230, ACM. DOI: 10.1145/2339530.2339722.

Malecki et al., "Automatic Selection of Cut-Point Connections for Dynamically-Cut Stream Processing Systems," U.S. Appl. No. 15/911,657, filed Mar. 5, 2018.

List of IBM Patents or Patent Applications Treated as Related, Signed Aug. 21, 2019, 2 pages.

STIC NPL search, May 2, 2019 (Year: 2019), U.S. Appl. No. 15/911,657.

IQ.IP.com search, Patents and Patent Publications, May 2, 2019 (Year: 2019), U.S. Appl. No. 15/911,657.

IQ.IP.com search, NPL, May 2, 2019 (Year: 2019), U.S. Appl. No. 15/911,657.

* cited by examiner

Pl    = [ Linux_x86 ]

Tech = [ Eth<sub>ernet</sub>, WiFi, Cell ]

F     = [ Kafka Framework ]

P     = [ kBin, TCP ]

502

→ 6 combinations ('Pl' and 'F' = constant):

| [ Eth, kBin ]  | =^= EB |
| [ Eth, TCP ]   | =^= ET |
| [ WiFi, kBin ] | =^= WB |
| [ WiFi, TCP]   | =^= WT |
| [ Cell, kBin ] | =^= CB |
| [ Cell, TCP ]  | =^= CT |

504

→ applied to:

cut

|    | EB  | ET  | WB | WT | CB | CT |
|----|-----|-----|----|----|----|----|
| EB | 1.0 |     |    |    |    |    |
| ET |     | 1.0 |    |    |    |    |
| WB | 1.0 |     |    |    |    |    |
| WT |     | 1.0 |    |    |    |    |
| CB | 1.0 |     |    |    |    |    |
| CT |     | 1.0 |    |    |    |    | plus weight factors →

|    | EB  | ET  | WB | WT | CB | CT |
|----|-----|-----|----|----|----|----|
| EB | 1.0 |     |    |    |    |    |
| ET |     | 0.9 |    |    |    |    |
| WB | 0.6 |     |    |    |    |    |
| WT |     | 0.8 |    |    |    |    |
| CB | 0.5 |     |    |    |    |    |
| CT |     | 0.7 |    |    |    |    |

|    | EB  | ET  | WB  | WT  | CB  | CT  |
|----|-----|-----|-----|-----|-----|-----|
| EB |     |     |     |     |     |     |
| ET |     |     |     |     |     |     |
| WB | 0.6 |     | 1.0 |     | 1.0 |     |
| WT |     | 0.7 |     | 1.0 |     | 1.0 |
| CB | 0.8 |     | 1.0 |     | 1.0 |     |
| CT |     | 0.9 |     | 1.0 |     | 1.0 | mapped to right matrix →

|    | EB   | ET   | WB | WT | CB | CT |
|----|------|------|----|----|----|----|
| EB |      |      |    |    |    |    |
| ET |      |      |    |    |    |    |
| WB | 0.36 |      |    |    |    |    |
| WT |      | 0.56 |    |    |    |    |
| CB | 0.4  |      |    |    |    |    |
| CT |      | (0.63) |  |    |    |    |

| | EB | ET |
|---|---|---|
| EB | 1.0 | 1.0 |
| ET | 1.0 | 1.0 |
| WB | 0.5 | 0.5 |
| WT | 0.5 | 0.5 |
| CB | 0.1 | 0.1 |
| CT | 0.1 | 0.1 | mapped to joint weighted capability matrix →

| | EB | ET | WB | WT | CB | CT |
|---|---|---|---|---|---|---|
| EB | | | | | | |
| ET | | | | | | |
| WB | 0.18 | | | | | |
| WT | | 0.28 | | | | |
| CB | 0.04 | | | | | |
| CT | | 0.063 | | | | |

AUTOMATIC SELECTION OF CUT-POINT CONNECTIONS FOR DYNAMICALLY-CUT STREAM PROCESSING SYSTEMS

FIELD OF THE INVENTION

The disclosure relates generally to stream processing, and more specifically, to a method for connecting graph processing cut endpoints of a stream processing system. The disclosure relates further to a related system for connecting graph processing cut endpoints, and a computer program product.

BACKGROUND

Analyzing a continuous flow of data continues to be a challenging task. Computations have to be performed at the same speed as the continuous flow of data is received by a computing system. Batch processing is not an option. Examples of such continuously flowing data are data from social media and video streams from, e.g., a surveillance camera. One approach to cope with these data streams is stream processing using graphs. A successful approach distributes the graph over a cluster of nodes, i.e., computing nodes. The nodes may be connected in series and/or in parallel. Each of the nodes may perform a specific task on the data. For a management of these interconnected nodes in the graph, a graph management system, as well as, a related framework for coordinating the work of all the nodes may be used.

In the past, a lot of emphasis has been put on the design of the graph as well as on the individual notes. Little or no emphasis was given to the requirements for the connection technology between the individual computing nodes of the graph.

SUMMARY

According to one aspect of the present disclosure, a method for connecting graph processing cut endpoints may be provided. The method may comprise determining a first capability matrix comprising, for each pairing of one side of the cut endpoint, capability values, applying weights to the capability values of the first capability matrix resulting in a first weighted capability matrix, and determining a second capability matrix comprising, for each pairing of another side of the cut endpoint, capability values. Thereby, for both, the first capability matrix and second capability matrix, the capability values may relate at least to a platform, a runtime framework, a connection technology, a protocol for a connection of a node of the stream processing system.

The method may further comprise determining a joint weighted capability matrix for two corresponding cut endpoints of a cut by multiplying corresponding capability matrix values of the first weighted capability matrix and the second capability matrix, and selecting a preferred connection for the cut by determining the highest matrix field of the joint weighted capability matrix.

According to another aspect of the present disclosure, a related system for connecting graph processing cut endpoints may be provided. The system may comprise a first determination unit adapted for determining a first capability matrix comprising, for each pairing of one side of the cut endpoint, capability values, an applying module adapted for applying weights to the capability values of the first capability matrix resulting in a first weighted capability matrix, and a second determination unit adapted determining a second capability matrix comprising, for each pairing of another side of the cut endpoint, capability values.

For both, the first capability matrix and second capability matrix, the capability values may relate at least to a platform, a runtime framework, a connection technology, a protocol for a connection of a node of the stream processing system.

Additionally, the system may comprise a third determination unit for determining a joint weighted capability matrix for two corresponding cut endpoints of a cut by multiplying corresponding capability matrix values of the first weighted capability matrix and the second capability matrix, and a selection module adapted for selecting a preferred connection for the cut endpoints by determining the highest matrix field of the joint weighted capability matrix.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, further any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

Figure 1:
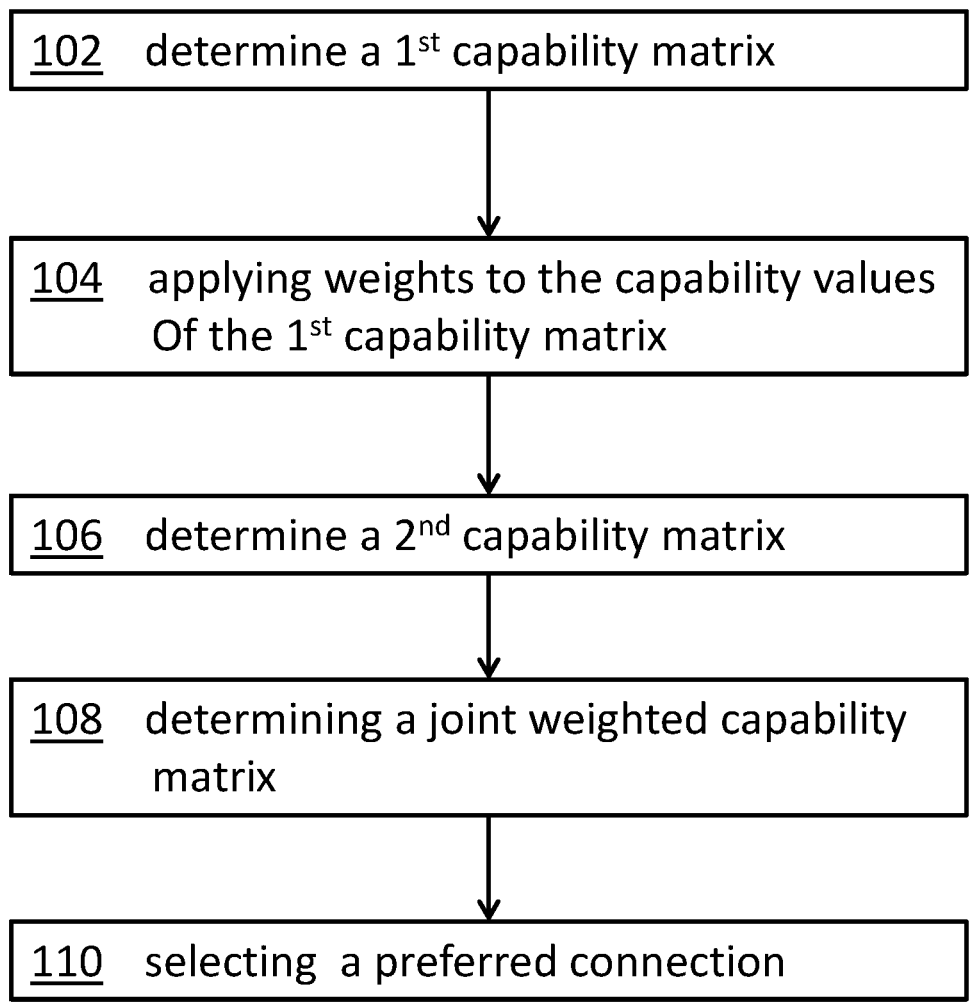

Preferred embodiments of the disclosure will be described, by way of example only, and with reference to the following drawings:

FIG. 1 illustrates a block diagram of an embodiment of the inventive method for connecting graph processing cut endpoints.

Figure 2:
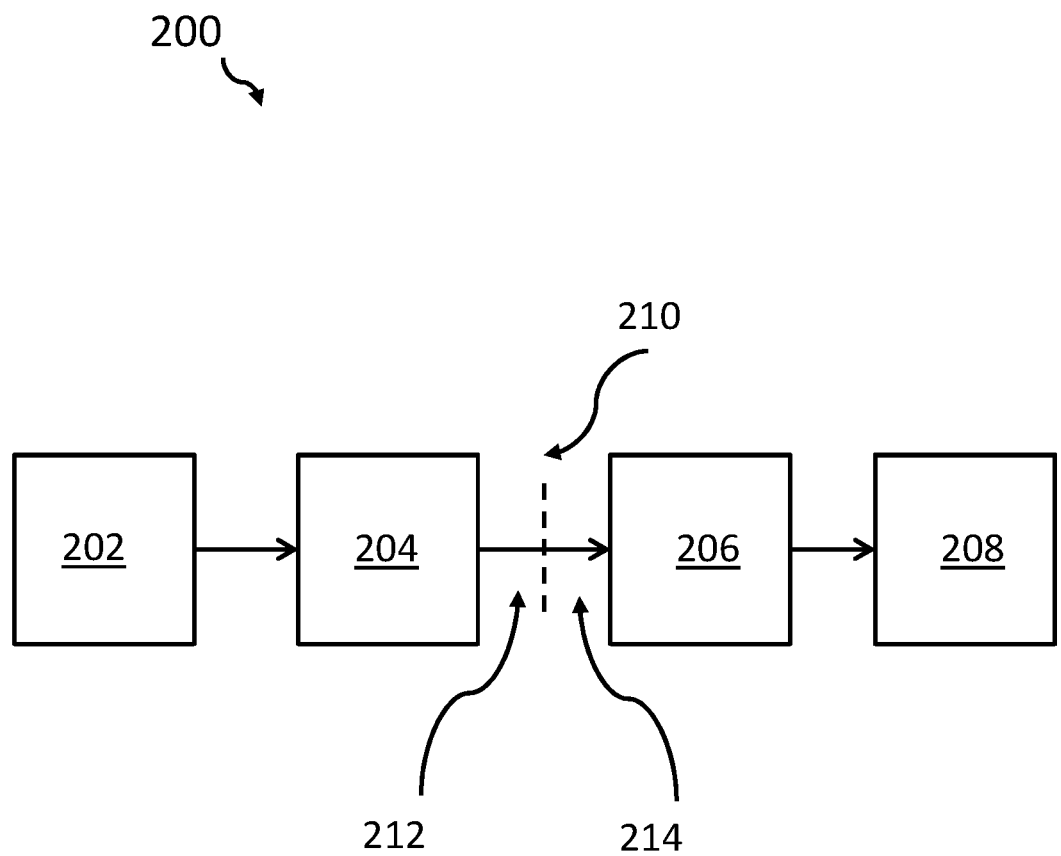

FIG. 2 illustrates an embodiment of a plurality of nodes for a stream processing system, wherein one cut between two cut endpoints is highlighted.

Figure 3:
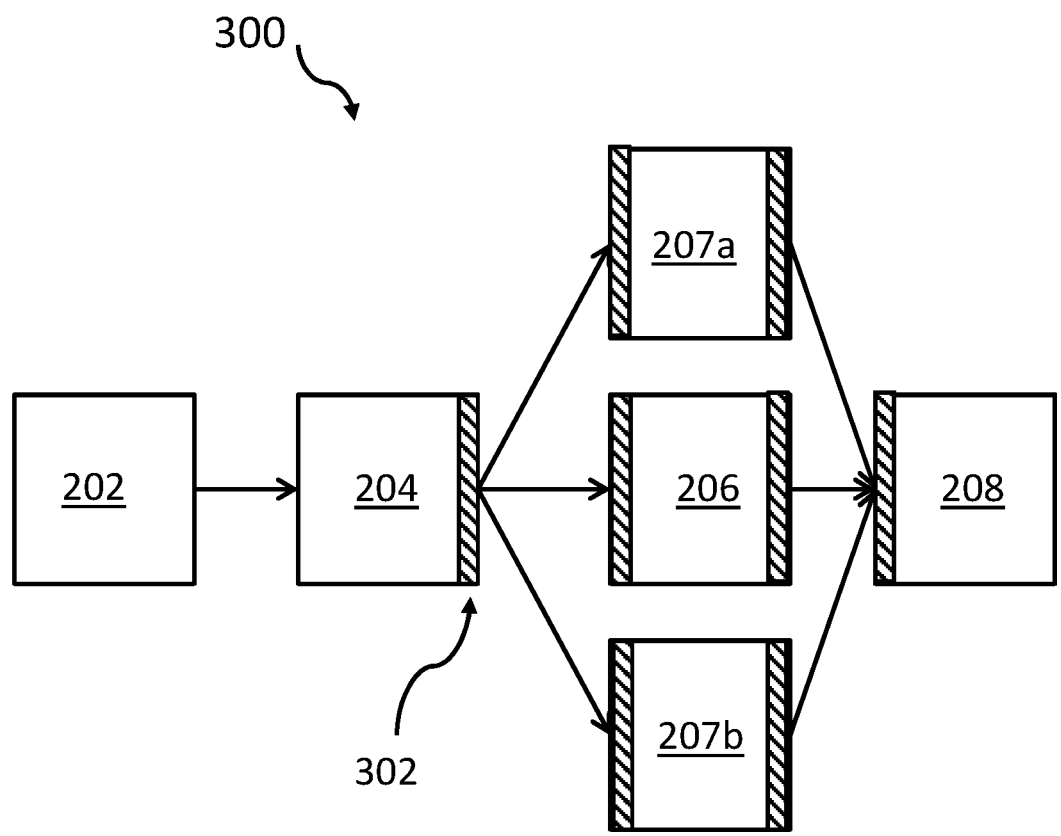

FIG. 3 illustrates another embodiment of the plurality of nodes for a stream processing system.

Figure 4:
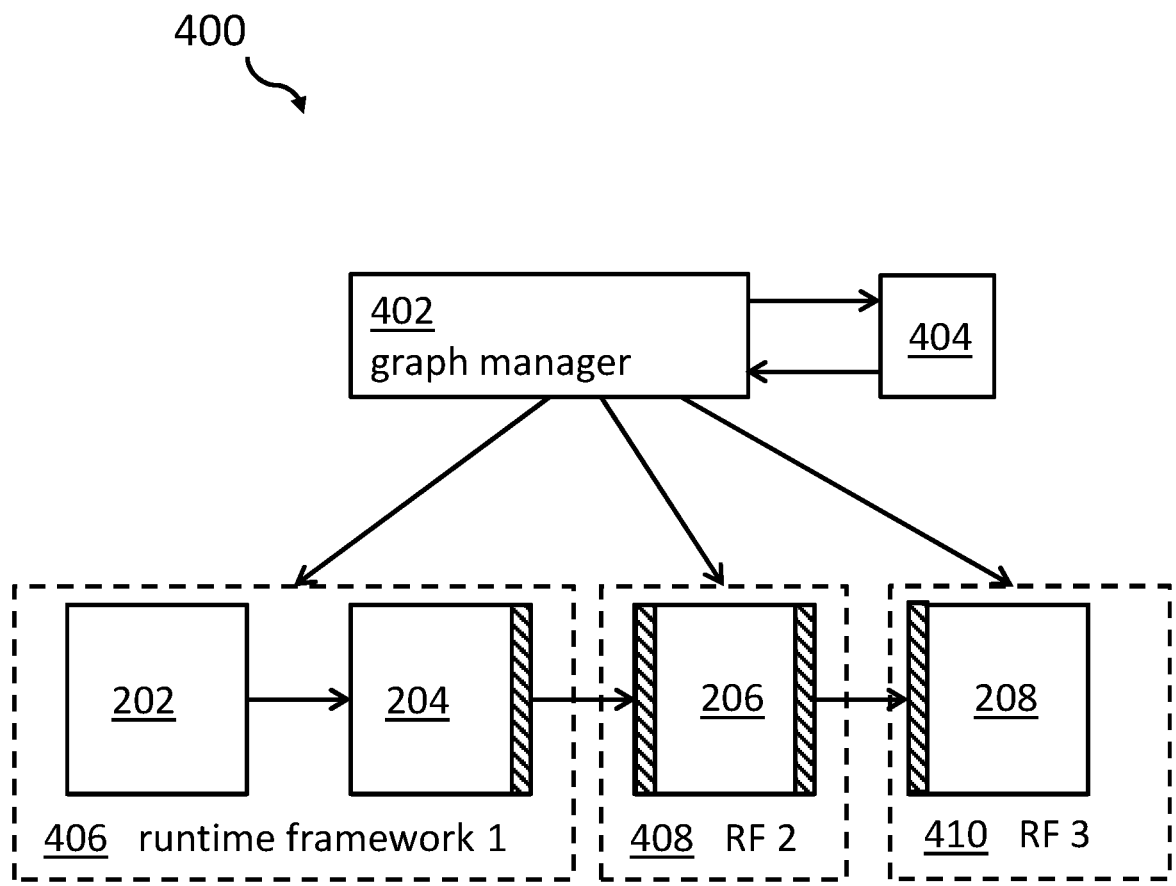

FIG. 4 illustrates an embodiment of elements required for a management of a stream processing system.

Figure 5:
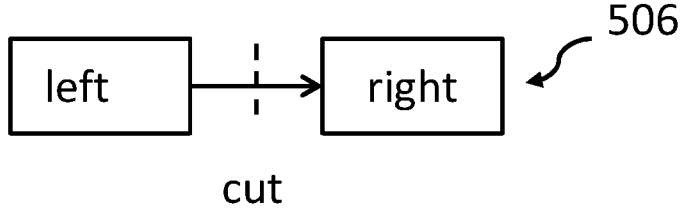

FIG. 5 illustrates exemplary dimensions for a characterization of a node and potential parameter combinations.

Figure 6:
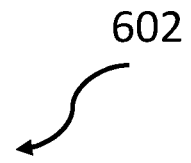
Figure 6:
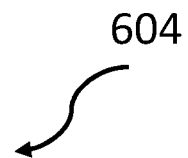

FIG. 6 illustrates an embodiment of a capability matrix of a right side of the cut endpoint without and with a weight factor matrix.

Figure 7:
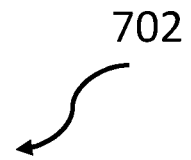
Figure 7:
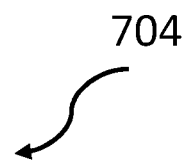

FIG. 7 illustrates an embodiment of a capability matrix of a left side of the cut endpoint.

Figure 8:
Figure 8:

FIG. 8 illustrates an embodiment of a matrix reflecting an additional dimension.

Figure 9:
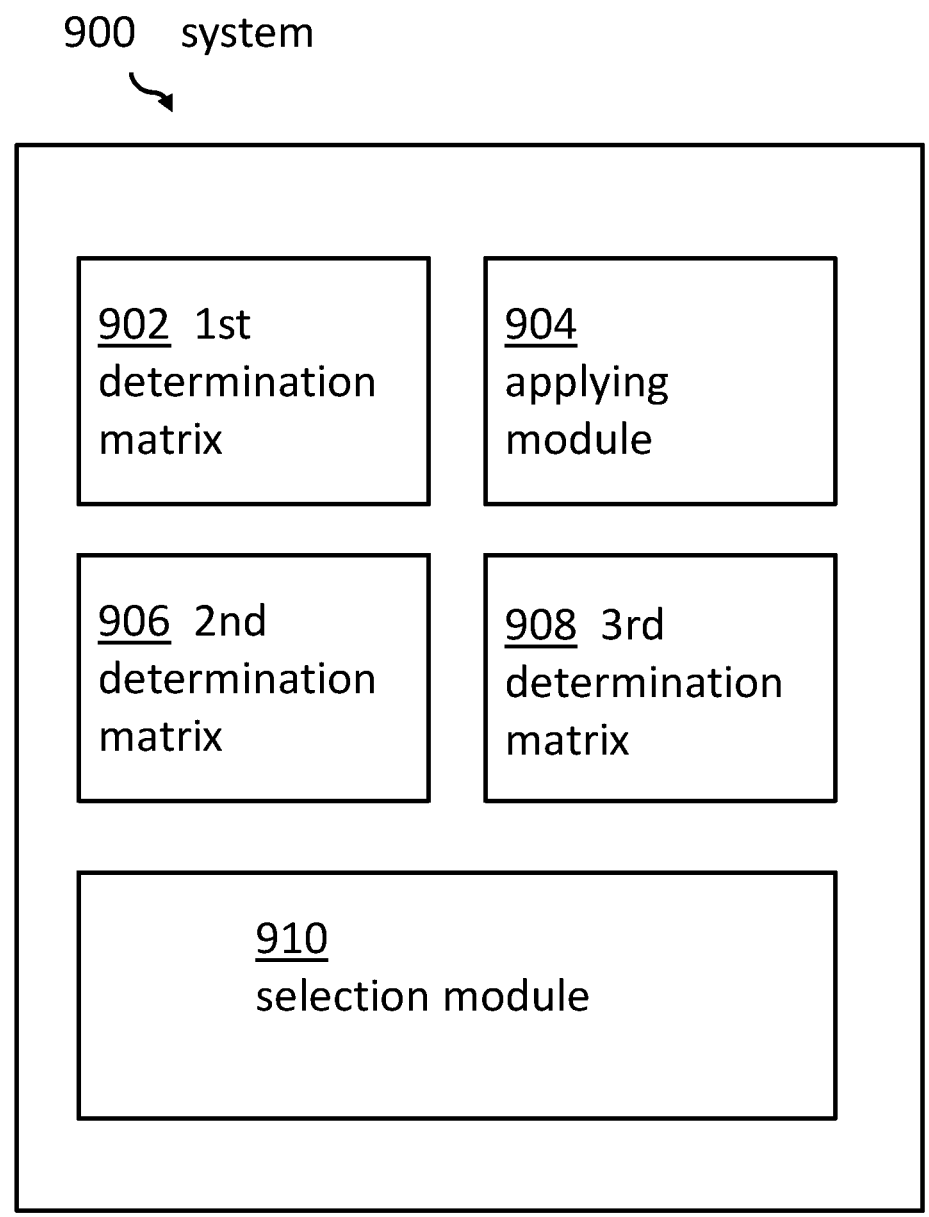

FIG. 9 illustrates a block diagram of an embodiment of the system for connecting graph processing cut endpoints of a stream processing system.

Figure 10:
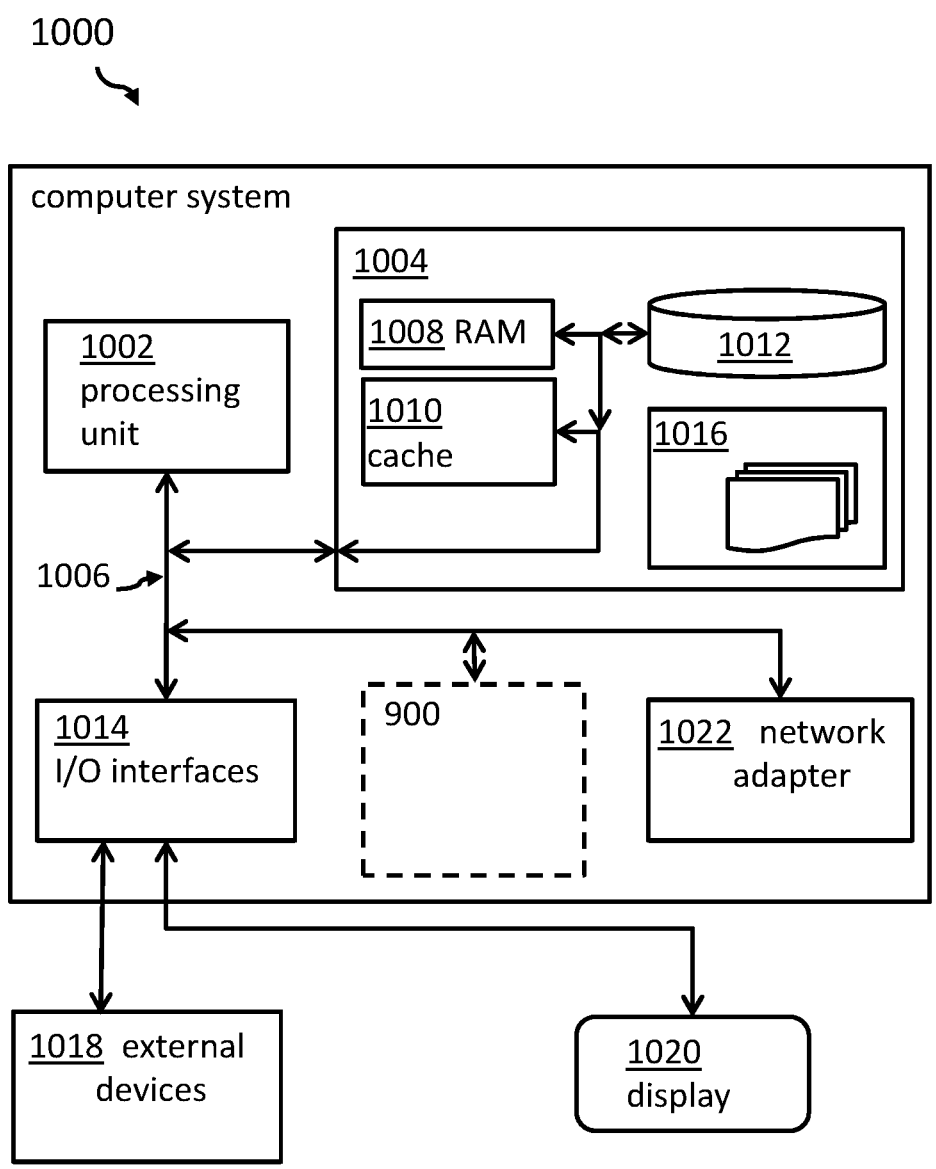

FIG. 10 illustrates a block diagram of an embodiment of a computing system instrumental for the disclosed method.

DETAILED DESCRIPTION

In the context of this description, the following conventions, terms and/or expressions may be used:

The term 'stream processing system' may denote a computer programming paradigm, equivalent to dataflow programming, event stream processing, and reactive programming, that may allow some applications to more easily exploit a limited form of parallel processing. Such applications may use multiple computational units, such as the floating point unit on a graphics processing unit or field-programmable gate arrays (FPGAs), without explicitly managing allocation, synchronization, or communication among those units.

The term 'graph processing cut endpoint' may denote a connection points between nodes in a stream processing system. The term 'cut endpoint' relates to the cut graph theory according to which is a partition of the vertices—i.e., nodes—of a graph cut into two disjoint subsets. Any cut may determine a cut-set, i.e., the cut of edges that have an endpoint in each subset of the partition. These edges are also set to cross the cut. In a connected graph, each cut-set determines a unique cut, and in some cases cuts may be identified with those cut-sets rather than with their vertex partitions. In a flow network—which may be related to the stream processing—an S-T cut may be a cut that requires the source and the sink to be in different subsets and its cut-set only consists of edges going from the source's side to the sink's side. The capacity of the S-T cut may be defined as the sum of capacities of each edge in the cut-set.

The term 'capability matrix' may denote a characterizing set of values for a node comprising at least values for the parameters: computing platform, a runtime framework, a connection technology and a protocol used. The capability matrix may have two dimensions if two of the four parameters have more than one option. The capability matrix may have three dimensions if three of the parameters have more than one option and so on. Generally, the capability matrix is a multi-dimensional matrix.

The term 'capability values' may denote entries in the capability matrix characterizing a specific cut endpoint, i.e., a node.

The term 'platform' may denote one or more parameters characterizing the computing system building the basis for the node, like "x86 running Linux operating system", "x86 running Windows operating system", or "Power processor running AIX operating system", or the like (Power processor and AIX are trademarks of IBM).

The term 'runtime framework' may denote an architectural framework for organizing and orchestrating different nodes, their connections and their individual tasks in a stream processing system.

The term 'connection technology' may denote a parameter characterizing technology used for a technical connection between two nodes, i.e., the connection technology bridging the cut of the graph.

The term 'protocol' may denote a communication protocol used for the connection.

The term 'joint weighted capability matrix' may denote a matrix having values combining the capabilities of a left side and a right side of a cut, wherein at least the variables of one of the two matrices have weight factors applied to them.

The term 'preferred connection' may denote a connection across a cut—i.e., from one node to another node in the stream processing system—being optimized for the highest performance of the overall system. The performance may be related to a highest possible throughput of the connection or a combination of individual compute power of the node in combination with the connection technology used.

The term 'analytics graph processing' may relate to the term 'stream processing system' mentioned above. The stream processing system may be used for analytical workloads in the streaming graph device.

The term 'further characteristic' may denote parameters describing a node above and beyond the set of basic parameters of a node, as described above. An example of a further characteristic may be a geographic location of a node, a vulnerability of a node or a general reliability of a specific node. Related to the geographic location may be natural hazards or other risks related to the node.

The term 'REST-based' may denote a communication protocol using the principles of REpresentational State Transfer (REST). It may represent a way of providing interoperability between computer systems on the Internet. REST-compliant Web services may allow requesting systems to access and manipulate textual representations of Web resources using a uniform and predefined set of stateless operations.

The disclosed method for connecting graph processing cut endpoints may offer multiple advantages and technical effects:

The automatic organization of the nodes, and in particular their connections, may allow dynamically adaptable stream processing systems. Nodes may be added or taken out of the stream processing system whenever they become available or may be needed for other tasks.

Traditionally, the nodes and their connections may be organized and connected using a manual approach using a graph manager or a similar tool. With the proposed method and system, this manual task may be eliminated, increasing the speed of the connection set-ups between the different nodes of the graph significantly. The graph may be reorganized automatically if new nodes may become available, so that certain aspects of the knowledge extraction of the streaming data may be emphasized more than others.

Thus, traditional limitations of graph computing and/or analytic graph computing can be overcome such that available resources in the form of computing nodes may be used more efficiently. Additionally, the manual operator efforts for connecting the different nodes may also be reduced or be eliminated completely. Furthermore, the weights implemented with the weight factor matrix may also reflect preferences, e.g., also power costs or data transmission costs of selected connection technology The disclosed method and system may be restricted to a base set of four dimensions for the automatic connection of graph processing cut endpoints or may be expanded to additional dimensions, like, e.g., a reflection of the geographical location of individual ones of the nodes of the stream processing system. Hence, for different cut points different communication technologies may be used.

In general, the present disclosure offers a possibility to fine tune an automatic selection of a communication technology and the section process may also be extended to other dimensions without a need to redesign the fundamental concept.

In the following, additional embodiments of the method—also applicable to the related system—will be described:

According to an embodiment of the method, the graph processing may be an analytical graph processing, i.e., graph processing applied to analytics. This may be a typical application of graph processing in which a continuous stream of data may have to be analyzed, like, social media data or video streams from surveillance cameras.

According to an embodiment of the method, the platform of each node of the stream processing system may comprise—at least—an operating system—e.g. Linux, Windows, AIX, or a hardware-architecture/operating-system combination, e.g., x86/Linux. Additionally, version numbers of the operating system may be added for characterizing the platform. The same may apply to specific processors implemented as part of the hardware architecture of the node.

According to another embodiment of the method, the connection technology may comprise one selected out of the group comprising a wireless local area network (WLAN)—e.g., in the form of Wi-Fi, Bluetooth, a Mobile Cell communication system—a wireless wide area network—e.g., in form of LTE/4G, GSM, HSDPA, HSPA, 5G—and wireline, like Ethernet, token ring, an I2C connection, a fiber channel, and the like. Thus, the various characteristics of connection technologies may be reflected as options in the disclosed method According to a further embodiment of the method, the protocol for each tuple may comprise at least one of TCP transmission control protocol), UDP (user datagram protocol), and a REST-based protocol. Also other communication protocols may be applicable.

According to an embodiment of the method, the platform may be indicative of a framework platform used for the stream processing. This could be selected out of—for example—Spark Streaming, Apache Flink, Apache Storm, Kafka Streams, Apache Samza. Various other stream processing frameworks exist and are developed on a continuous basis. The disclosed method may be agnostic to the used stream processing framework, i.e., the method may work with any selected framework, as long as one is selected.

According to an embodiment of the method, the stream processing system may comprise a plurality of serialized and/or parallelized nodes as cut endpoints. For all or a predefined subgroup of connections, the determination of the first connection matrix, the determination of the second connection matrix, and the selection of a best connection may be performed dynamically, e.g., after each reconfiguration of the graph, after performance and/or workload changes, etc. The dynamic adaption of the connections may be supported by a history function for a performance optimization of the stream processing system.

According to an optional embodiment, the method may also comprise applying weights or weight factors to the capability values of the second capability matrix resulting in a second weighted capability matrix before determining the joint weighted capability matrix. This way, not only weight factors may be applied to the first capability matrix but also the second capability matrix. A more fine-tuned approach for the selection of the connectivity technology may be performed to cross the cuts of the stream processing network of nodes.

According to an additionally advantageous embodiment, the method may also comprise mapping a further characteristic—e.g., a geolocation of the node, and availability expectation, an MTBF value (mean time between failure)—of the nodes (i.e., cut endpoints) on the one side and the other side of the cut to the joint weighted capability matrix. Also this may support a more fine-tuned stream processing system.

According to an additional embodiment, the method may also comprise maintaining a database for storing previous determined connections between the cut points, and using information about the previous determined connections as a basis for determining the weights to the capability values of the first capability matrix or a second capability matrix. Thus, those previously used connections with a trusted high-performance report may be emphasized by increasing the value(s) for weight factors, applied to the related capability matrix In the following, a detailed description of the figures will be given. All instructions in the figures are schematic. Firstly, a block diagram of an embodiment of the inventive method for connecting graph processing cut endpoints is given. Afterwards, further embodiments, as well as embodiments of the system for connecting graph processing cut endpoints, will be described.

FIG. 1 illustrates a block diagram of an embodiment of the method 100 for connecting graph processing cut endpoints—in particular automatically connecting the cut endpoints, i.e., nodes of the graph—of a stream processing system. The method 100 comprises determining, 102, a first capability matrix comprising, for each pairing of one side of the cut endpoint, capability values and applying, 104, weights to the capability values of the first capability matrix resulting in a first weighted capability matrix.

The method comprises further determining, 106 a second capability matrix comprising, for each pairing of another side of the cut endpoint, capability values. Thereby, for both, the first capability matrix and second capability matrix, the capability values relate at least to a platform, a runtime framework, a connection technology, a protocol for a connection of a node of the stream processing system; all of these parameters characterizing the computing platform of a specific node.

Furthermore, the method 100 comprises determining, 108, a joint weighted capability matrix for two corresponding cut endpoints of a cut by multiplying corresponding capability matrix values of the first weighted capability matrix and the second capability matrix. Basically, this method step represents overlaying one matrix with the other and multiplying corresponding matrix values $m_{i,j}$.

Additionally, the method 100 comprises selecting, 110, a preferred connection for the cut endpoints—i.e., between the nodes—by determining the highest matrix field of the joint weighted capability matrix. Last but not least an optional step of the method 100 comprises actually establishing the connection between the nodes, i.e., the cut endpoints.

It may be noted that the disclosed method may be applied to all real and potential connections between nodes in the graph of the stream processing system and not only for one.

FIG. 2 illustrates an embodiment of a plurality of nodes 202, 204, 206, 208 for a stream processing system 200. One cut 210 between the two cut endpoints 212, 214 is highlighted. This figure should underline the general concept of cut endpoints. It also makes clear that a node is related in a one-to-one fashion to a cut endpoint. Thus, a cut endpoint may also refer to the relating node in the stream processing system.

FIG. 3 illustrates another embodiment of the plurality of nodes 202, 204, 206, 207a, 207b, 208 for a stream processing system 300. Some of the nodes—in particular 204, 206 207a, 207b, and 208 comprise striped ends representing connectors at the source-side and the sink-side of a node. These connectors may support different connection technologies in terms of physical network and protocol.

FIG. 4 illustrates an embodiment of elements required for a management of a stream processing system 400. The nodes 202, 204, 206, 208 are shown in dashed frame boxes. These frame boxes may represent components of a runtime framework for the stream processing system. Examples have already been named above: the Spark Streaming framework, the Apache Flink framework, the Apache Storm framework, the Kafka Streams framework, the Apache Samza framework, just to name a few. Skilled people will know more of these stream processing frameworks.

Consequently, different nodes may be encircled with different portions of the stream of graph processing framework 406, 408, 410: runtime framework 1, RF 2 (runtime framework 2), RF 3 (runtime framework 3). It may also be possible that two or more nodes are managed together by a runtime framework, as shown in the case of the two nodes 202 and 204.

A framework management component like the graph manager 402 may orchestrate the interrelationships of the different nodes of the graph and may coordinate the workload performed by the different nodes. However, in traditional graph computing systems, a manual connection process—symbolized by box 404—has to be performed.

FIG. 5 illustrates exemplary dimensions 502 for a characterization of a node and potential parameter combinations. The dimension comprises at least a platform (Pl), a connection technology (Tech), a framework (F) and a protocol (P). Examples of options for the different parameters are shown in FIG. 5, 502. It may be noted that kBin may refer to the Kafka framework binary protocol.

Because two of the platform parameters are shown with only one option (Pl and F) and the other two parameters (Tech, P) a total number of 2×3=6 combinations are possible. And these are shown with abbreviations in box 504. E.g., the abbreviation ET may refer to the combination of ETHernet connection technology and TCP as connection protocol. The other abbreviations and references are self-explanatory for a skilled person.

Such a capability evaluation may be done and applied to a left and a right side of a cut, as shown at the bottom of FIG. 5, 506.

FIG. 6 illustrates an embodiment of a capability matrix 602 of a right side of a cut endpoint and a weight factor matrix 604. It may be noted that the capability matrix 602 only comprises digital values: "0"s and "1"s (not capable or capable). The "0"s are not shown for compensability reasons. The "1"s are shown with a decimal point to indicate that these values may also be interpreted as real values for downstream multiplications.

To these capability values weight factors may be applied, as shown by the matrix 604. Because the capability values only have "0"s and "1" s, corresponding values of the two matrices are multiplied, basically resulting in the weight factor in each cell the capability matrix 604 has a "1".

FIG. 7 illustrates an embodiment of a capability matrix 702 of a left side of the cut endpoint. As an example, this matrix is also shown as a weighted capability matrix 702, i.e., a weight factor matrix has already been applied to the capability matrix only comprising "0"s and "1" s.

Matrix 704 represents the joint weighted capability matrix. It is a result of the overlaying of the weighted capability matrix 604 with weighted capability matrix 702. Corresponding matrix values of the two matrices 604 and 702 are multiplied with each other resulting in the four remaining values in the joint weighted capability matrix 704. As a reminder: zeros are not shown in the matrix for simplicity reasons.

The resulting matrix shows a combination of ETHernet/TCP (ET) with Cell/TCP (CT) as the highest resulting matrix value (0.63 encircled). Consequently, this connection technology/protocol is used for a connection of the two cut endpoints, i.e., the two computing nodes of the stream processing system to be connected automatically.

FIG. 8 illustrates an embodiment of a matrix reflecting an additional dimension—e.g., reflecting geo-locations of a node—for building the joint weighted capability matrix. For this, the resulting joint weighted capability matrix 704 of FIG. 7 needs to be mapped to the geo-matrix 802. The result is shown as matrix 804. Corresponding values of matrix 704 and geo-matrix 802 have been multiplied. In this case, the highest value in the resulting matrix 804 is a combination of WLAN/TCP (WT) and ETHernet/TCP (ET). The geo-matrix 802 may have reflected that a node may be located in an area in which a mobile cell connection is difficult and may only support low transmission rates. Therefore, another highest value—if compared to the matrix 704 of FIG. 7—in the resulting matrix 804 indicates the connection technologies/protocol to be used for connecting automatically the two cut-endpoints (0.28 encircled).

FIG. 9 illustrates a block diagram of an embodiment of the system 900 for connecting graph processing cut endpoints of a stream processing system. The system comprises a first determination unit 902 adapted for determining a first capability matrix comprising, for each pairing of one side of the cut endpoint, capability values, an applying module 904 adapted for applying weights to the capability values of the first capability matrix resulting in a first weighted capability matrix, and a second determination unit 906 adapted determining a second capability matrix comprising, for each pairing of another side of the cut endpoint, capability.

As already mentioned earlier, for both, the first capability matrix and second capability matrix, the capability values relate at least to a platform, a runtime framework, a connection technology, a protocol for a connection of a node of the stream processing system.

The system 900 also comprises a third determination unit 908 for determining a joint weighted capability matrix for two corresponding cut endpoints of a cut by multiplying corresponding capability matrix values of the first weighted capability matrix and the second capability matrix, and a selection module 910 adapted for selecting a preferred connection for the cut endpoints by determining the highest matrix field of the joint weighted capability matrix.

Embodiments of the disclosure may be implemented together with virtually any type of computer, regardless of the platform being suitable for storing and/or executing program code. FIG. 10 illustrates, as an example, a computing system 1000 suitable for executing program code related to the disclosed method.

The computing system 700 is only one example of a suitable computer system and is not intended to suggest any limitation as to the scope of use or functionality of embodiments of the disclosure described herein, regardless, whether the computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couple various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, a storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the disclosure.

The program/utility, having a set (at least one) of program modules 1016, may be stored in memory 1004 by way of example, and not limiting, as well as an operating system, one or more application programs, other program modules, and program data. Each of the operating systems, one or more application programs, other program modules, and program data or some combination thereof, may include an implementation of a networking environment. Program modules 1016 generally carry out the functions and/or methodologies of embodiments of the disclosure, as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014. Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of computer system/server 1000 via bus 1006. It should be understood that although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A method for connecting graph processing cut endpoints of a stream processing system, the method comprising:
applying weights to capability values of a first capability matrix resulting in a first weighted capability matrix;
determining a joint weighted capability matrix for two corresponding cut endpoints of a cut by multiplying corresponding capability matrix values of the first weighted capability matrix and the second capability matrix; and
selecting a preferred connection for the cut endpoints by determining the highest matrix field of the joint weighted capability matrix.

2. The method according to claim 1, wherein the graph processing is an analytics graph processing.

3. The method according to claim 1, wherein a platform of each node of the stream processing system comprises an operating system.

4. The method according to claim 1, wherein a connection technology comprises one selected out of the group comprising WLAN, wireless wide area network, and wireline.

5. The method according to claim 1, wherein a protocol for each tuple comprises at least one of TCP (Transmission Control Protocol), UDP (User Diagram Protocol), and a REST (Representational State Transfer)-based protocol.

6. The method according to claim 1, wherein a platform is indicative of a framework platform used for the stream processing.

7. The method according to claim 1, wherein the stream processing system comprises a plurality of serialized and/or parallelized nodes as cut endpoints, and wherein for all or a predefined subgroup of connections the determination of the first connection matrix, the determination of the second connection matrix, and the selection is performed dynamically.

8. The method according to claim 1, further comprising applying weights to the capability values of the second capability matrix resulting in a first weighted capability matrix before determining the joint weighted capability matrix.

9. The method according to claim 1, further comprising:
mapping a characteristic of the nodes on the one side and the other side of the cut to the joint weighted capability matrix.

10. The method according to claim 1, further comprising:
maintaining a database for storing previous determined connections between the cut points, and
using information about the previous determined connections as a basis for determining the weights to the capability values of the first capability matrix, or a second capability matrix.

11. A system for connecting graph processing cut endpoints of a stream processing system, the system comprising:
a first determination unit adapted for determining a first capability matrix comprising, for each pairing of one side of the cut endpoint, capability values; and
an applying module adapted for applying weights to the capability values of the first capability matrix resulting in a first weighted capability matrix;
a second determination unit adapted determining a second capability matrix comprising, for each pairing of another side of the cut endpoint, capability;
a third determination unit for determining a joint weighted capability matrix for two corresponding cut endpoints of a cut by multiplying corresponding capability matrix values of the first weighted capability matrix and the second capability matrix; and
a selection module adapted for selecting a preferred connection for the cut endpoints by determining the highest matrix field of the joint weighted capability matrix.

12. The system according to claim 11, wherein the stream processing system is an analytics graph processing system.

13. The system according to claim 11, wherein a platform of each node of the stream processing system comprises an operating system.

14. The system according to claim 11, wherein a connection technology comprises one selected out of the group comprising wireless local area network, wireless wide area network, and wireline.

15. The system according to claim 11, wherein a protocol for each tuple comprises a (Representational State Transfer) REST-based protocol.

16. The system according to claim 11, wherein a platform is indicative of a framework platform used for the stream processing.

17. The system according to claim 11, wherein the stream processing system comprises a plurality of serialized and/or parallelized nodes as cut endpoints, and wherein for all or a predefined subgroup of connections the determination of the first connection matrix, the determination of the second connection matrix, and the selection is performed.

18. The system according to claim 11, further comprising:
a second applying module adapted for applying weights to the capability values of the second capability matrix resulting in a first weighted capability matrix before determining the joint weighted capability matrix.

19. The system according to claim 11, further comprising:
a mapping unit adapted for mapping a characteristic of the nodes on the one side and the other side of the cut to the joint weighted capability matrix.

20. A computer program product for connecting graph processing cut endpoints of a stream processing system, the computer program product comprising a computer readable storage medium having program instructions embodied therewith, the program instructions being executable by one or more computing systems to cause the one or more computing systems to:
applying weights to capability values of a first capability matrix resulting in a first weighted capability matrix;
determine a joint weighted capability matrix for two corresponding cut endpoints of a cut by multiplying corresponding capability matrix values of the first weighted capability matrix and the second capability matrix; and
select a preferred connection for the cut endpoints by determining the highest matrix field of the joint weighted capability matrix.

* * * * *